US006228902B1

(12) United States Patent
Brueggeman et al.

(10) Patent No.: US 6,228,902 B1
(45) Date of Patent: *May 8, 2001

(54) TACKY POLYMER PARTICLE ANTI-STICK ADDITIVE

(75) Inventors: Barry Gene Brueggeman; Peter Joseph Ferenz, both of Houston; Joel Edward Schmieg, Humble, all of TX (US)

(73) Assignee: Exxon Chemical Patents, Inc., Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,346

(22) Filed: Jul. 22, 1997

Related U.S. Application Data

(63) Continuation of application No. 08/397,339, filed on Mar. 2, 1995, now abandoned, which is a continuation-in-part of application No. 08/205,059, filed on Mar. 2, 1994, now abandoned.

(51) Int. Cl.[7] ....................................................... C08K 9/00
(52) U.S. Cl. ........................ 523/200; 523/203; 523/204; 523/205; 523/209; 523/210; 523/216
(58) Field of Search ................................... 523/200, 203, 523/204, 205, 209, 210, 216; 428/407

(56) References Cited

U.S. PATENT DOCUMENTS

| 4,898,616 | 2/1990 | Hyche et al. | 106/271 |
| 4,904,531 | 2/1990 | Kelly et al. | 428/404 |
| 4,960,644 | 10/1990 | Hyche et al. | 428/407 |
| 5,041,251 | 8/1991 | McCoskey et al. | 264/130 |

FOREIGN PATENT DOCUMENTS

| 0115307 | 8/1984 | (EP) . |
| 0575900 | 12/1993 | (EP) . |

OTHER PUBLICATIONS

Letter from Mark A. Montgomery with Eastman to Ms. Denise Wolfs with Exxon Chemical Company, dated Jun. 12, 1997.
Brochure entitled "Eastman Aquastab Additives Delivery System", Published by Eastman Chemical Company, Kingsport, TN, USA (1992).
Derwent Abstract (Basic): EP 575900 A, 1995 Derwent Info Ltd. (Abstract of EP A1 0575900 above).

Primary Examiner—Helen L. Pezzuto
(74) Attorney, Agent, or Firm—Douglas W. Miller; Frank E. Reid; Stephen D. Pradnuk

(57) ABSTRACT

Emulsion delivery systems for applying anti-stick additives to polymer particles, provide free-flowing particles of polymers or polymer blends, that without the anti-stick additives tend to agglomerate. The agglomeration presents storage and handling difficulties. The anti-stick additives are selected from the group consisting of primary amides, secondary amides, ethylene bisamides, waxes, talc and silica.

14 Claims, No Drawings

TACKY POLYMER PARTICLE ANTI-STICK ADDITIVE

This is a continuation, of application Ser. No. 08/397,339, filed Mar. 2, 1995, now abandoned, which is a Continuation-In-Part of U.S. Ser. No. 08/205,059 filed Mar. 2, 1994, now abandoned.

TECHNICAL

This invention relates generally to anti-stick coatings for tacky polymer particles or particulate polymer blends and methods for applying the coatings. More specifically, this invention relates to an anti-stick coating and a method for coating particles of adhesives, polyolefins, and polyolefin blends.

BACKGROUND

As long as there have been tacky polymers or blends of polymers, transporting and handling these materials has been a problem. The problem is due to the agglomeration or sticking together of these polymers. These polymers are solid or semi-solid at room temperature. After polymerization, blending, or formulating, the polymers are solidified in some particulate form, such as pellets, spheres, granules or other shapes such as pillows. Those of ordinary skill in the art will appreciate that there are many geometries for such polymers. However, whatever geometry is chosen, agglomeration remains a problem.

There are several classes of polymers or polymer blends that are tacky or have a tendency to stick to one another or to their container. These may include, but are not limited to ethylene copolymers, propylene copolymers, or adhesives such as hot melt adhesives and pressure sensitive adhesives. With the growth of the volume of these materials produced in the world, the need to transport them in larger quantities has grown as well.

Generally, these polymers are rendered tacky by a number of factors. These factors include the comonomer amount, the comonomer type, the melt index or viscosity, the softness of the polymer, and the inherently tacky materials that can be added to polymers to improve their performance in intended end uses, such as adhesives. The low secant moduli and/or the relatively low softening points make the deformation of these materials under weight, pressure, and/or heat a particular problem. Such deformation allows the surface contact area of the particles, pellets, spheres, pillows or granules to increase. This deformation is known by several names such as creep or cold flow.

Further aggravating the polymer's tendency towards tackiness is the method of transport used to convey these products to the end user. Transporting modes can be 5 to 25 kilograms in a bag, as much as 300 or 1000 kilograms in boxes or bins, or even in bulk truck or rail containers where 15,000 to 90,000 kilograms are shipped at a time. In such shipments, the polymer's natural tendency to stick to itself or to the container is amplified by the weight of the polymer on itself, and, in the case of bags, the weight of other bags stacked one on the other for shipping and/or storage. Compounding this situation are warm or hot conditions such as seen in summer in much of the world, or year around conditions in tropical or semi-tropical climates. One reason for this aggravated tendency to agglomerate or stick together at elevated temperatures is that as the polymers get closer to or exceed their softening points they can deform to such an extent to stick together to form a large matrix or even a solid block.

However, in less severe conditions, the polymers may only stick together at their initial contact points without substantial deformation. Under such conditions the pellets or other polymer shapes may not fuse, but their intimate contact causes them to stick together, necessitating some form of physical breaking of the sticking to permit handling. Such physical breaking apart of agglomerated particles could be as simple as using a shovel or other instrument to weaken or break the sticking points such that the sticking points are eliminated to allow relatively free flow, or breaking enough of the sticking points to allow the material's weight to break the remaining sticking points. In either case this can cause use of additional labor, and lead to potential safety concerns. In some cases, freeing such fused polymer can be substantially impossible where cold flow has resulted in substantially a block of fused polymer or where the polymer is contained in a substantially inaccessible container.

Also contributing to the sticking, bridging, or fusing problem is the particle geometry and size. Smaller particles, in general, have greater surface area to volume ratios and, therefore, more contact than larger particles.

A number of ways to solve the agglomeration problem have been tried in the past with varying degrees of success. One method is to coat the materials with a microfine dust or powder of polyethylene homopolymer or copolymer. This method is generally not effective in cases where the powder has a higher melting point than the polymer coated, as the coating material can cause melting point variations, phase separation, poorer clarity (especially in adhesive formulations), loss of tenacity or bonding strength, or other problems in the fabrication or compounding of the coated polymers. This method is difficult to use commercially, as the powder or dust can cause explosion risks in a commercial environment. Additionally, there is usually only a weak bond between the coating and the base polymer, resulting in a partial removal of the coating during shipping and handling due to vibrations and particle movement. This removal will reduce or eliminate the coating's beneficial effect, and additionally pose another potential problem of loose dust that will complicate the handling of the polymer particles, for instance by plugging air filters on pneumatic conveying equipment.

U.S. Pat. No. 3,528,841 discloses a decrease in tackiness of polymers by coating with a parting agent that is a polyolefin powder. The powder is applied in the range of 250 ppm to 1000 ppm. The parting agent is dispersed in water by a block copolymer of ethylene oxide and propylene oxide.

U.S. Pat. No. 3,779,785 discloses a low melting point wax used as a parting agent for ethylene-vinyl acetate copolymers. The wax is employed in the form of a finely divided aqueous emulsion. The wax level is 1% to 5% by weight.

Another method of solving the sticking polymer problem is to blend into the polymer fatty amides that are known to be incompatible with the polymer. The incompatibility of these fatty amides will cause them to "bloom" or exude to the surface of the polymer particle. This method has been proposed to reduce sticking of pellets to one another. There are at least two problems associated with this proposed solution. The first is that when such additives are put into a polymer pellet, the blooming is a slow time related function. It is quite likely that these fatty amides will not bloom to the pellet surface in time to prevent agglomeration and/or fusing. Second, in many polymer applications, the polymer may not be processed through a melt extruder before loading in a container for transport, thereby eliminating the ability to add these additives without further cost and delay.

U.S. Pat. No. 4,510,281 discloses tack-free polymer pellets, defined by a stick point of 40° C. at most (for ethylene vinyl acetate copolymers) and other polymers having a stick point of less than 60° C. The polymers are ethylene vinyl acetates, terpolymers of ethylene with vinyl acetate and carbon monoxide, copolymers of methacrylic acid, copolymers of ethylene methylmethacrylate and terpolymers of ethylene, n-butyl acrylate and carbon monoxide. An ethylene bisoleamide additive is blended with the polymers and then melt extruded into pellets.

Another method to reduce the agglomeration problem is to change the shape or geometry of the solid polymer, polymer blend, or adhesive to, for instance, a "pillow" shape. Such a technique is viable usually only when the polymer or blend is adequately hard in the frozen or solid state at room or slightly elevated temperatures, to prevent sticking. Alternatively, reducing the contact area per unit volume, by making larger particles has practical limits for materials such as polyolefins which are usually pneumatically conveyed.

There exists a need for an easily applied, effective, non-deleterious coating and coating method that will permit storage, shipping and handling of many types of soft, tacky polymer particles.

SUMMARY

It has been discovered that a combination of emulsifiable waxes, surfactants, and bases, in a water emulsion, combined with an anti-stick agent or agents in the emulsion, gives a coating to polymer particles that is both relatively easy to apply and effective in preventing sticking or agglomeration.

The polymer particles are selected from the group consisting of:

a) copolymers of ethylene and an ethylinically unsaturated ester or a carboxylic acid, where the comonomer is present in the range of from about 5 to about 25 mole percent based on the total moles of the copolymer, and the comonomer is chosen from the group consisting of vinyl acetate, ethyl acrylate, methyl acrylate, n-butyl acrylate, isobutyl acrylate, methyl methacrylate, acrylic acid, methacrylic acid, or combinations of one or more of these comonomers as well as their ionomeric partial salts;

b) ethylene alpha-olefin copolymers and terpolymers (These will generally have comonomer contents in the range of from about 0.2 to about 20 mole percent based on the total moles of the copolymer or terpolymers. These materials tend to become soft, tacky, or sticky below about 0.91 g/cc density. Such copolymers and terpolymers are both semi-crystalline to amorphous) the alpha-olefins are selected from 1-butene, 1-hexene, 1-octene, or combinations of these alpha-olefins;

c) hot melt adhesives which are mixtures of polymer and adjuvants, usually tackifying resin, wax or low glass transition temperature ($T_g$) materials such as oils and low molecular weight polymers;

d) pressure sensitive adhesives which are similar to hot melt adhesives, with the addition of oils and other adjuvants;

e) polypropylene copolymers and terpolymers which generally include propylene ethylene copolymers and propylene alpha-olefin copolymers where the alpha-olefin is selected from the group consisting of 1-butene, 1-hexene, 1-octene or a combination of these monomers (The alpha-olefin(s) is present in the range of from about 0.2 to about 20 mole percent based on the total moles of the copolymer or terpolymer);

f) polypropylene blends including blends of an elastomer or a low molecular weight hydrocarbon; and g) ethylene propylene (EP) and ethylene propylene diene monomer (EPDM) polymer elastomers.

More particularly, the invention relates to anti-stick agents that may be incorporated into the aqueous emulsions and methods for applying the resulting particle coating. The emulsion will be comprised of a surfactant present in the range of from about 2 to about 10 percent by weight, a base present in the range of from about 0.05 to 1.0 weight percent, an emulsifiable wax in the range of from about 3 to about 20 weight percent, and water in the range of from about 40 to about 60 weight percent and anti-stick additive in the range of from about 10 to about 60 weight percent of at least one anti-stick additive where the anti-stick additive is capable of preventing particles, pellets, or other shapes from sticking together. The anti-stick additives are selected from the group consisting of talc, silica, primary amides, secondary amides, ethylenebisamides, a second wax, or combinations of two or more of these anti-stick additives. The particle size of the emulsifiable wax will generally be in the range of from 0.01 $\mu$m to 0.2 $\mu$m, while the particle size of the anti-stick additives will generally be in the range of from 1 to 150 $\mu$m.

Under conditions of heat and pressure typically present during the storage and handling of these polymer particles or particles of polymer blends, these coatings will permit granules, pellets, or other shapes of polymer particles to be free flowing.

DESCRIPTION OF THE PREFERRED EMBODIMENTS

Introduction

In certain embodiments of the present invention concerns certain classes of polymers, and coatings for these polymers, that are effective in reducing the polymer's tendency to stick to itself or agglomerate. Ethylene copolymers, propylene copolymers, and adhesives that in their uncoated form exhibit a tendency to stick to one another or to their container, are coated with a material that reduces or substantially eliminates the sticking or agglomerating. A detailed description follows of certain preferred coatings for use in coating polymers and preferred methods for applying these coatings.

Those skilled in the art will appreciate that numerous modifications to these preferred embodiments can be made without departing from the scope of the invention. For example, though the properties of copolymers of ethylene and ethylinically unsaturated esters are used to exemplify the attributes of the coated polymers, many other types of tacky and/or soft polymers may be used. Further, although emulsions containing certain anti-sticking agents are used in the examples that follow, many other materials or compounds may be used. To the extent that our description is specific, this is solely for the purpose of illustrating preferred embodiments of our invention and should not be taken as limiting our invention to these specific embodiments.

The Coatings

We have discovered that certain combinations of emulsifiable waxes, surfactants, bases, and anti-stick materials can be used to easily and effectively prevent agglomeration, bridging or sticking of polymer pellets or other shapes, under storage and handling conditions involving pressure, weight, or heat or a combination thereof. These materials, when combined in a liquid solution or emulsion, permit easy and effective application. Generally the materials effective in preventing sticking are chosen from inorganic materials such as talc or silica or alternatively organic materials such as primary amides, secondary amides, ethylenebisamides, waxes or combinations of these materials.

Components of the Coating Formulation

The coating formulation can be based on aqueous emulsion materials such as those available from Eastman Chemical Co. under the trade name Aquastab®. These materials, and methods of making them, are described in U.S. Pat. Nos. 4,898,616 and 4,880,440 by Hyche, et al. These U.S. Patents are incorporated by reference in the present application for purposes of U.S. Patent practice.

Preferably, the aqueous emulsion materials will have in the range of from about 2 to about 10 weight percent of a surfactant, a base in the range of from about 0.05 to 1.0 weight percent, an emulsifiable wax in the range of from about 1 to about 20 weight percent, in the range of from about 20 to about 60 weight percent of at least one additive capable of preventing sticking or agglomeration. The balance of the formulation would be a liquid, preferably an aqueous-based mixture of a water-miscible material and water, more preferably deionized water.

The base may be selected from sodium tetraborate, sodium carbonate, potassium hydroxide, sodium bicarbonate, calcium carbonate or magnesium carbonate. The base imparts to the emulsion a pH of in the range of from about 7 to about 10.5.

The emulsifiable wax is chosen from any wax which can be readily emulsified, for instance, emulsifiable polyolefin waxes such as oxidized polyolefin waxes. The emulsifiable wax is characterized by a melting point of up to about 135° C. Those of ordinary skill in the art will understand that many factors affect the emulsification process, and the ability of an emulsion to retain its stability. Generally the emulsifiable wax will have a particle size small enough that the particle size will not significantly contribute to instability of an emulsion. However, the range of particle size for the emulsifiable wax in the emulsion, will be below 0.2 $\mu$m in the range of from 0.01 to 0.2 $\mu$m, more preferably from 0.05 to 0.2 $\mu$m.

The surfactant is chosen from aliphatic alcohols or ethoxylated aliphatic alcohols.

The anti-sticking additive is selected from talc (such as ABT-2500 from Pfizer Inc.), diatomaceous earth (such as Celite from Manville Corp.), amorphous silica (such as Davison 955 from W. R. Grace), primary amides such as for instance stearamide, arachidamide, behenamide, oleamide and erucamide, secondary amides, such as for example stearyl erucamide, erucyl erucamide, oleyl palmitamide, oleyl oleamide, stearyl stearamide and erucyl stearamide, ethylenebisamides, such as for example ethylene biserucamide, ethylene bisstearamide, and ethylene bisoleamide, waxes such as paraffinic, isoparaffinic or Fischer-Tropsch wax, or combinations of these materials.

The anti-stick additive is placed in the emulsion at a level that will be both economical and effective to prevent sticking or agglomeration of the coated particles, pellets or other shapes. To attain the goal of economy, the amount of anti-stick additive in the emulsion should be maximized consistent with maintaining the emulsions ability to be pumped and sprayed. A reason for limiting the amount of anti-stick additive deposited on the polymer particle, is the possibility of deleterious effects on the end use product properties. It will be understood by those of ordinary skill in the art that substantially lower amounts of the anti-stick additive may be put in the emulsion. The lower limit of anti-stick additive in the emulsion is defined by the amount that will substantially reduce particle sticking under storage and handling conditions.

The anti-stick additive may be added to the emulsion in the range of from about 10 to 60 weight percent based on the total weight of the blended emulsion. Preferably the anti-stick additive will be present in the range of from about 20 to about 60 weight percent. More preferred is a range of from about 30 to about 55 weight percent. Most preferred in the range of from about 40 to about 50 weight percent.

The anti-stick additive will have a particle size mean generally exceeding 1 $\mu$m, preferably exceeding 3 $\mu$m. More preferably the anti-stick additive will have a mean particle size in the range of from 3 to 150 $\mu$m, even more preferably in the range of from 2–100 $\mu$m, most preferably in the range of from 15 to 75 $\mu$m. It will be understood by those of ordinary skill in the art that by, mean particle size, Applicants intend that the mean will be descriptive of a distribution, and not generally include particles of only one size rather a distribution of sizes. Also note that the particle size distributions are generally non-Gaussian, accordingly the distributions can include relatively small percentages of particles on either end of the distribution that will be either extremely small or extremely large compared to the mean.

The emulsion may be placed on the polymer particles in ways that will be apparent to those of ordinary skill in the art. These methods include spraying or dipping. Spraying is preferred. Subsequent to application, drying may be carried out in any manner, but is most effectively carried out by pneumatically conveying the particles. Subsequent to drying, the polymer particles are left with a substantially continuous coating that will have definable contents of some of the emulsion ingredients. For instance, the emulsifiable waxes and anti-stick agents will be substantially preferentially left on the polymer surface, while the other ingredients, for instance, the base and the surfactant will tend to preferentially be substantially removed with the water during the drying process.

The minimum amount of anti-stick additive on a treated polyolefin or adhesive will be understood by those of ordinary skill in the art to be that amount that will substantially eliminate the sticking of the polyolefin or adhesive under its conditions of storage and handling. The upper limit will be defined by an amount that begins to interfere in the end use properties of the polymer or inhibit the handling and application of the emulsion.

The particle size of the anti-stick additive is also understood to be a size or size distribution that at certain concentrations performs the function of maintaining polymer particle flowability. Other factors affecting efficiency of the anti-stick coating are hardness and concentration in the emulsion and/or on the polymer particles to be treated.

This anti-stick level will generally range from about 100 parts per million (ppm) (based on the weight of the polymer) to about 8,000 ppm. Preferably the levels will be in the range of from about 500 ppm to about 7,000 ppm. More preferably the levels will be in the range of from about 1,000 ppm to about 6,000 ppm. Most preferred is a range of from about 1,000 ppm to about 4,000 ppm. Hardness and particle size of the anti-stick addiditve play a part in the efficacy of the anti-stick additive, and these factors combined with the level of inclusion (concentration) are determinative of a specific anti-stick additives effectiveness.

The amount of emulsifiable wax on the polymer surface after drying will be in the range of from about 50 to 2000 ppm, preferably 100 to 1500 ppm, more preferably from 200 to 1500 ppm.

The invention will be further illustrated by the following examples although it will be understood that these examples are included merely for purposes of illustration and are not intended to limit the scope of the invention. Concentrations listed in the Examples are in parts per million by weight (ppm) and temperatures are in ° C.

Three types of tests were run. The first, Protocol A, is performed as follows. The polymer particles are visually inspected on a flat surface. The amount of sticking together, movement relative to one another, or sticking to the surface is noted after moving particles with an instrument. If the particles or pellets exhibit sticking to one another and/or dragging on the flat surface, the particles are deemed not to be free flowing and compaction testing is not attempted, because experience has shown that if the pellets agglomerate on a flat surface, the agglomeration in a compaction test would be unacceptable. If the particles flow freely on a flat surface and do not visibly stick to each other, the compaction test is used.

The second type of test run is a compaction test, Protocol B. Two to ten grams (the weight of the sample will depend upon the product's density and bulk density) of a sample is placed in a compaction cell. The compaction cell volume is approximately 12.5 cm$^3$, the diameter of the cell is about 25 mm, and the height is approximately 25 mm. A load is placed on the polymer of either 280 grams or 1 kilogram to simulate either a loaded box (Condition 1) or loaded bulk rail car (Condition 2), respectively. The cell with the weight is placed in an oven for 24 or 48 hours at one or more of three temperatures, 38° C., 49° C. and 60° C. These conditions are intended to simulate bulk handling of these polymers.

The third type of test run is a flowability test, Protocol C. This test is specifically designed to simulate both the internal geometry of a bulk rail car as well as a storage silo. Both geometries are replicated in a device that has a circular cross section and has an angled bottom. (30 cm. total length and 9 cm. internal diameter. The bottom of the cylinder narrows to 3 cm. in diameter at an angle 30° to the vertical). Approximately 500 g. of particles or pellets are placed in the container with the bottom covered. The container is placed in an oven for 3 days at 43° C. The silo is then removed from the oven, the bottom stop is removed, and the time it takes for the container to empty is recorded. If the pellets do not empty in 5 minutes (300 seconds), they are prodded from the bottom of the silo and the timing continued. If another 5 minutes elapses without the container emptying, the test is discontinued.

EXAMPLE 1

Run sets 1–11 are run as described below and the results are seen in Table 1. A 4 dg/min. melt index ethylene methyl acrylate copolymer (EMA-1) containing 32% by weight methyl acrylate is prepared. Nine sample sets are prepared using an Aquastab® emulsion. The emulsion is used without anti-stick additives (run sets 1–3) to determine the efficacy of the delivery emulsion itself as an anti-stick coating consisting of water, base, emulsifiable wax and surfactant. In run sets 1–3, the emulsion formulations are varied by using different levels of two different emulsifiable waxes. Run sets 1 and 3 use Epolene® E-14 (Eastman Chemical Co.), run set 2 used Epolene® E-20 (both E-14 and E-20 are believed to be low molecular weight polyolefin waxes). In run sets 1 and 2 the concentration of the emulsifiable wax on the polymer after drying ranges from 500 ppm to 10,000 ppm. In run 3 the concentration of wax ranges from 3,000 to 6,000 ppm. Neither of these waxes at any of the concentrations, provides a pellet surface that is free flowing on a flat surface, and the coated pellets of run sets 1 to 3 are not tested further.

Run sets 4 and 5 utilize conventional polyethylene antioxidants carried by the emulsion. In run 4, Irganox 1076® (Ciba Geigy) is used at a 3000 ppm level and in run 5, BHEB (2,6 di-tert butyl4-ethyl phenol) from 400 to 2000 ppm is added. In both runs 4 and 5, the pellets again remain tacky after coating and drying, so further compaction tests are not conducted.

Run sets 6 and 7 utilize talc (ABT 2500 from Pfizer Corp.) at a level of 2000 ppm and run set 8 an ethylene bisoleamide (EBO) at 3000 ppm. Run 9 is a combination of talc (2000 ppm) and EBO (3000 ppm). In runs 6–9 the pellets are observed to not stick together on a flat surface and are tested in compaction tests according to protocol B. The results shown in Table 1 ambient condition show that for run sets 6 and 7 pellets stick together, but break apart easily. At 60° C., during an extended test run of 72 hrs., the pellets are fused and not easily dislodged. The level of agglomeration of these polymer particles at 60° C. is judged to be unacceptable.

Pellets for runs 8 and 9 exhibit acceptable flowability after 24 hours at 38° C., but after 24 hours at 60° C. the flowability is judged unacceptable.

Runs 10 and 11 are made on coated pellets, where the coating technique used to deliver the anti-stick agent to the pellets was to "dust" the anti-stick agent onto the dry but sticky pellets. In both runs 10 and 11, (using talc and diatomaceous earth at 2000 ppm respectively). The pellets exhibit flowability substantially equal to that of runs 8 and 9. However, this application technique is used only for control purposes, as such a technique is generally unsuitable for large commercial installations.

TABLE 1

| | | | Protocol A | | Protocol B | | | | |
| | | | | | Condition 1 | | | Condition 2 | | |
| Run | Additive | Concentration (ppm) | Drying Condition | Pellet Surface/ Performance | Ambient | 38° C. | 60° C. | Ambient | 38° C. | 60° C. |
|---|---|---|---|---|---|---|---|---|---|---|
| 1 | Epolene E14 | 500–10000 | 50° C. | Very Tacky | | | | | | |
| 2 | Epolene E20 | 500–10000 | 50° C. | Very Tacky | | | | | | |
| 3 | Epolene E14 | 3000–6000 | Ambient | Very Tacky | | | | | | |
| 4 | Irganox 1076 | 3000 | 50° C. | Pellets agglomerated | | | | | | |
| 5 | BHEB | 400–2000 | Ambient | Tacky | | | | | | |
| 6 | Talc | 2000 | Ambient | Free flowing | 48 hr$^4$ | | 72 hr$^3$ | 48 hr$^4$ | | |
| 7 | Talc | 2000 | 38° C. | Free flowing | | | | | | |
| 8 | EBO | 3000 | 38° C. | Free flowing | | 24 hr$^4$ | 24 hr$^2$ | | | |
| 9 | Talc/EBO | 2000/3000 | 38° C. | Free flowing | | 24 hr$^4$ | 24 hr$^2$ | | | |
| 10 | Talc | 2000$^1$ | — | Free flowing | | 24 hr$^4$ | 24 hr$^2$ | | 24 hr$^4$ | 24 hr$^2$ |

TABLE 1-continued

|  |  |  |  |  | Protocol A | | Protocol B | | | | |
|---|---|---|---|---|---|---|---|---|---|---|---|
| | | Concentration | Drying | Pellet Surface/ | Condition 1 | | | Condition 2 | | | |
| Run | Additive | (ppm) | Condition | Performance | Ambient | 38° C. | 60° C. | Ambient | 38° C. | 60° C. | |
| 11 | Diatomaceous Earth | 2000[1] | — | Free flowing | | 24 hr[4] | 24 hr[2] | | 24 hr[4] | 24 hr[2] | |

Notes:
[1]Additive added by dusting the dry pellet surface.
[2]Pellets fused during test, but not into a solid block.
[3]Pellets fused into solid block during test.
[4]Pellets "set-up" in cell configuration, but broke apart easily when touched.

EXAMPLE 2

The EMA-1 copolymer described in Example 1 and EVA-1, a 420 dg./min. melt index ethylene vinyl acetate copolymer containing 29% vinyl acetate were coated using the Aquastab emulsion delivery method. The coated pellets are placed in a compaction cell under 280 g. weight to approximate storage in a 454 kg box (Condition 1) and under 1 kg. weight to approximate storage in a 65,000 kg bulk rail car (Condition 2). Pellets remain under pressure for the indicated time and temperature. All coated pellets are free flowing with no applied pressure.

Runs 12–15 (Table 2) were used to determine differences between both different emulsifiable waxes and levels of oleylpalmitamide (OPA). Low molecular weight wax (lmw wax) and a montan ester (me) wax were tested as emulsifiable waxes, both at 2000 and 3000 ppm OPA levels. Table 2 represents averages of tests run under Condition 1 and Condition 2.

TABLE 2

| | | OPA Concentration | lmw wax | | | me wax | | |
|---|---|---|---|---|---|---|---|---|
| Run | Copolymer | (ppm) | 38° C. | 49° C. | 60° C. | 38° C. | 49° C. | 60° C. |
| 12 | EMA-1 | 2000 | 3 | 1 | 1 | 3 | 1 | 1 |
| 13 | EMA-1 | 3000 | 3.5 | 1 | 1 | 3.5 | 1 | 1 |
| 14 | EVA-1 | 2000 | 4.5 | 2 | 1 | 4.5 | 2 | 1.5 |
| 15 | EVA-1 | 3000 | 4.5 | 2 | 1 | 4.5 | 2 | 1.5 |

1. Pellets fuse and do not break apart.
2. Pellets form a solid mass, but break apart with much pressure.
3. Pellets form a solid mass, but break apart with moderate pressure.
4. Pellets form a mass, but break apart into individual pellets with slight pressure.
5. Pellets remain separate.

Table 2 shows the results of the compaction testing using protocol B. The results demonstrate that for both EMA-1 and EVA-1, at a compaction test temperature of 38° C. (to simulate slightly elevated temperature conditions typical for storage and handling), the pellets are still flowable at both levels of OPA (2000 & 3000 ppm) with both emulsifiable waxes. However at higher temperatures, the pellets become unacceptably fused. A value of 2.5 or less is unacceptable.

For runs 16 and 17 (Table 3) EMA-1 and EVA-1 were tested according to protocol C, without any Aquastab emulsion or anti-stick additive. Results with the evacuation time above 300 seconds indicate an unacceptable fusing of the polymer, preventing flow.

TABLE 3

| | | | | Emptying Time (sec.) | |
|---|---|---|---|---|---|
| Run | Copolymer | Parting Agent | Concentration (ppm) | lmw wax | me wax |
| 16 | EMA-1 | NONE | 0 | 334 | 334 |
| 17 | EVA-1 | NONE | 0 | 600+ | 600+ |

EXAMPLE 3

For runs 18–26 (Table 4) an EVA copolymer (480 dg/min. melt index ethylene vinyl acetate copolymer containing 28% vinyl acetate (EVA-2)) was used. The polymer had 1000 ppm of stearamide blended in the pellets. The pellets are further treated with one of two Fischer-Tropsch waxes (as anti-stick additives). The Fischer-Tropsch waxes have average diameters of 5 μm (FT-1) and 10 μm (FT-2). Two methods were used to deliver the anti-stick coating to the pellets. The Fischer-Tropsch wax is available from Moore & Munger, Shelton, Conn. under the tradename Paraflint® Spray 40 (mean particle size of about 13 μm (FT-2)) and Spray 30 (mean particle size of about 5 μm (FT-1)). The dusting technique of Example 1 (runs 10 and 11) and the Aquastab emulsion delivery method (emulsifiable wax, a base, a surfactant, water and the anti-stick additive). As shown in Table 4, the dusting technique provides a flowable product, however its general commercial applicability as discussed, is less favorable than an emulsion delivery technique.

When delivery is achieved using the Aquastab emulsion as the delivery method, the tack polymer particles begin to be acceptably flowable at about 1500 ppm of the FT waxes. Also of note is the difference between runs 21 and 22 where the 2 particle sizes appear (sprayed emulsion application) to have substantially the same emptying time, but at the next highest level of concentration, runs 23 and 24, the larger (≈10 μm mean particle size) FT wax performs clearly better. Further, at Further, at the 2000 ppm level (runs 25 and 26) the layer particle size wax (run 26) still shows an order of magnitude, better emptying time.

TABLE 4

| Run | Resin | Anti-Stick Agent (Mean Particle Size μm) | Anti-Stick Agent Concentration (ppm) | Emptying Time (sec.) Dusting | Sprayed Emulsion |
|---|---|---|---|---|---|
| 18 | EVA-2 | None | 0 | 320 | 320 |
| 19 | EVA-2 | FT-1 (5) | 500 | 12 | 313 |
| 20 | EVA-2 | FT-2 (13) | 500 | 24 | 310 |
| 21 | EVA-2 | FT-1 (5) | 1000 | 7 | 312 |
| 22 | EVA-2 | FT-2 (13) | 1000 | 4 | 310 |
| 23 | EVA-2 | FT-1 (5) | 1500 | 6 | 308 |
| 24 | EVA-2 | FT-2 (13) | 1500 | 7 | 59 |
| 25 | EVA-2 | FT-1 (5) | 2000 | 5 | 110 |
| 26 | EVA-2 | FT-2 (13) | 2000 | 4 | 24 |

EXAMPLE 4

A set of runs (runs 27–29 Table 5) was made using a second EMA resin (EMA-2), a 5 dg./min. melt index ethylene methyl acrylate copolymer with 27% methyl acrylate. EMA-2 is coated with FT-2 as an anti-stick agent using the Aquastab delivery system. EMA-2 is slightly harder than EMA-1 and EVA-1, and should show a lower tendency to agglomerate in an uncoated state. Referring to Table 3 EMA-1 and EVA-1 empty in 334 seconds, and 600+seconds, respectively, versus EMA-2 (Table 5) at 319 seconds. Even with this slightly harder resin, at 0% additive, the resin had an unacceptable flow (319 seconds), but after addition of 1000 ppm or above, of the anti-stick agent, the flow properties proved to an acceptable level.

TABLE 5

| | EMA-2 | |
|---|---|---|
| Run | FT-2 Concentration (ppm) | Emptying Time (sec.) |
| 27 | 0 | 319 |
| 28 | 1000 | 61 |
| 29 | 2000 | 24 |

EXAMPLE 5

A set of runs using EVA-3, a 420 dg/minute melt index, 28% (weight) viny/acetate content copolymer, available from Exxon Chemical Company under the grade name XW-41. The EVA-3 material is coated with Aquastab® emulsions containing varying concentrations (500 ppm increments starting at 1500 ppm up to 3000 ppm) of varying mean particle size distribution ranging from a nominal 5 μm to a nominal 50 μm. The larger particle size distribution tend to generally show good emptying time (less than 300 sec) at lower concentrations.

Although the present invention has been described in considerable detail with reference to certain preferred versions thereof, other versions are possible. For example, other coating techniques and other anti-stick additives are contemplated. Therefore, the spirit and scope of the appended claims should not be limited to the description of the preferred versions contained herein.

We claim:

1. An anti-stick coating for polymer or polymer blend particles, said coating comprising in the range of from about 50 to about 2,000 ppm of an emulsifiable wax said wax having a particle size not exceeding about 0.2 μm, and wherein the improvement comprises the addition to said coating of an anti-stick additive selected from the group consisting of a primary amide, a secondary amide, an ethylenebisamide, waxes and combinations thereof, said anti-stick additive being present in the range of from about 500 ppm to about 6,000 ppm based on the total weight of the polymer or polymer blend and wherein said anti-stick additive has a mean particle size exceeding about 1 μm.

2. The coating of claim 1 wherein said anti-stick additive is present in the range of from about 1000 ppm to about 4000 ppm, and wherein said anti-stick additive has a particle size exceeding about 3 μm based on the weight of said polymer, wherein said polymer or polmer blend is selected from the group consisting of ethylene ethylinically unsaturated esters, ethylene carboxylic acids, ionomers of said acids, hot melt adhesives, pressure sensitive adhesives, polypropylene copolymers, propylene terpolymers and combinations of said polymers.

3. The coating of claim 1 wherein said polymer particle includes an ethylene ethylinically unsaturated ester copolymer, wherein said ethylinically unsaturated ester is selected from the group consisting of vinyl acetate, ethyl acrylate, methyl acrylate, n-butyl acrylate, isobutyl acrylate, methyl methacrylate, and combinations of two or more of these monomers, said ester being present in the copolymer in the range of from about 5 to about 30 mole percent based on the weight of the copolymer, and wherein said anti-stick agent is a Fischer-Tropsch wax.

4. The coating of claim 1 wherein said polymer particle includes an ethylene alpha-olefin copolymer, wherein said alpha-olefin copolymer is selected from the group consisting of 1-butene, 1-hexene, 1-octene, and combinations of said alpha-olefins, said alpha-olefin being present in the range of from about 0.6 to about 20 mole percent, based on the total weight of the polymer.

5. The coating of claim 1 wherein said polymer particle includes a propylene copolymer, wherein said propylene copolymer is a copolymer of propylene and a comonomer selected from the group consisting of ethylene, 1-butene, 1-hexene, 1-octene, and combinations of these monomers.

6. A coating for applying additives to polymeric particles, said composition comprising about 2 to about 10 percent by weight of a surfactant, about 1 to about 20 percent by weight of an emulsifiable wax said emulsifiable wax having a particle size not exceeding about 0.2 μm, about 0.05 to about 1.0 percent by weight of a base, in the range of from about 40 to about 60 percent by weight of water, and wherein the improvement comprises in the range of from about 20 to about 60 weight percent by weight of at least one anti-stick additive, said anti-stick additive being selected from the group consisting of a primary amide, a secondary amide, an ethylenebisamide, a wax and combinations of two or more of these anti-stick additives and wherein said anti-stick additive has a mean particle size exceeding about 1 μm.

7. A coated ethylene alpha-olefin copolymer comprising an ethylene alpha-olefin copolymer having a density less than about 0.91 g/cc, wherein said coating comprises in the range of from about 100 to about 1500 ppm of an emulsifiable wax having a particle size not exceeding about 0.2 $\mu$m, and an anti-stick additive selected from the group consisting of primary amide, a secondary amide, an ethylenebisamide, a wax and combinations of two or more of said anti-stick additives, said anti-stick additive being present in the range of from about 1000 ppm to about 6000 ppm based on the total weight of the polymer and wherein said anti-stick additive has a mean particle size exceeding about 1 $\mu$m.

8. An ethylene copolymer having an anti-stick coating, said ethylene copolymer comprising ethylene and an ethylinically unsaturated ester wherein said ethylinically unsaturated ester is selected from the group consisting of ethyl acrylate, n-butyl acrylate, isobutyl acrylate, methyl acrylate, vinyl acetate, and combinations of two or more of said ethylinically unsaturated esters; and wherein said anti-stick coating comprises in the range of from about 200 ppm to about 1500 ppm of an emulsifiable wax having a particle size not exceeding about 0.2 $\mu$m, the improvement comprising in the range of from about 1000 ppm to about 4000 ppm of an anti-stick additive based on the total weight of said ethylene copolymer, said anti-stick additive being selected from the group consisting of a primary amide, a secondary amide, an ethylenebisamide, a wax and combinations of two or more of said anti-stick additives and wherein said anti-stick additive has a mean particle size exceeding about 1 $\mu$m.

9. An anti-stick coated polymer particle, comprising a polymer selected from the group consisting of ethylene methylacrylate, ethylene ethyl acrylate, ethylene n-butyl acrylate, ethylene isobutyl acrylate, ethylene acrylic acid, ethylene methacrylic acid, ethylene vinyl acetate, propylene ethylene, propylene butene, propylene hexene, propylene octene, ethylene propylene elastomer, ethylene propylene diene elastomers, hot melt adhesives, and pressure sensitive adhesives; and an anti-stick additive selected from the group consisting of a paraffinic wax, an isoparaffinic wax and a Fischer-Tropsch wax, said coating being present in the range of from about 100 ppm to about 8000 ppm said anti-stick additive has a mean particle size exceeding about 1 $\mu$m.

10. The coating of claim 1 wherein said emulsifiable wax has a particle size in the range of from about 0.01 to about 0.2 $\mu$m, and wherein said anti-stick additive has a mean particle size in the range of from about 1–150 $\mu$m.

11. The coating of claim 1 wherein said emulsifiable wax has a particle size in the range of from about 0.01 to about 0.2 $\mu$m, and wherein said anti-stick additive has a mean particle size in the range of from about 2–100 $\mu$m.

12. The coating of claim 1 wherein said emulsifiable wax has a particle in the range of from about 0.01 to about 0.2 $\mu$m, and wherein said anti-stick additive has a mean particle size in the range of from about 15–75 $\mu$m.

13. The coating of claim 1, wherein said anti-stick additive comprises a Fischer-Tropsch wax.

14. The coating of claim 10 wherein said anti-stick additive has a mean particle size of 3 $\mu$m or more.

* * * * *